(No Model.) 2 Sheets—Sheet 1.

G. & F. F. CIMIOTTI.
MACHINE FOR CLIPPING SEAL AND OTHER SKINS.

No. 307,524. Patented Nov. 4, 1884.

WITNESSES:
A. Schehl.
Otto Risch.

INVENTORS:
Gustav Cimiotti
Ferdinand F. Cimiotti
BY Paul Goepel.
ATTORNEY (No Model.) 2 Sheets—Sheet 2.
G. & F. F. CIMIOTTI.
MACHINE FOR CLIPPING SEAL AND OTHER SKINS.
No. 307,524. Patented Nov. 4, 1884.
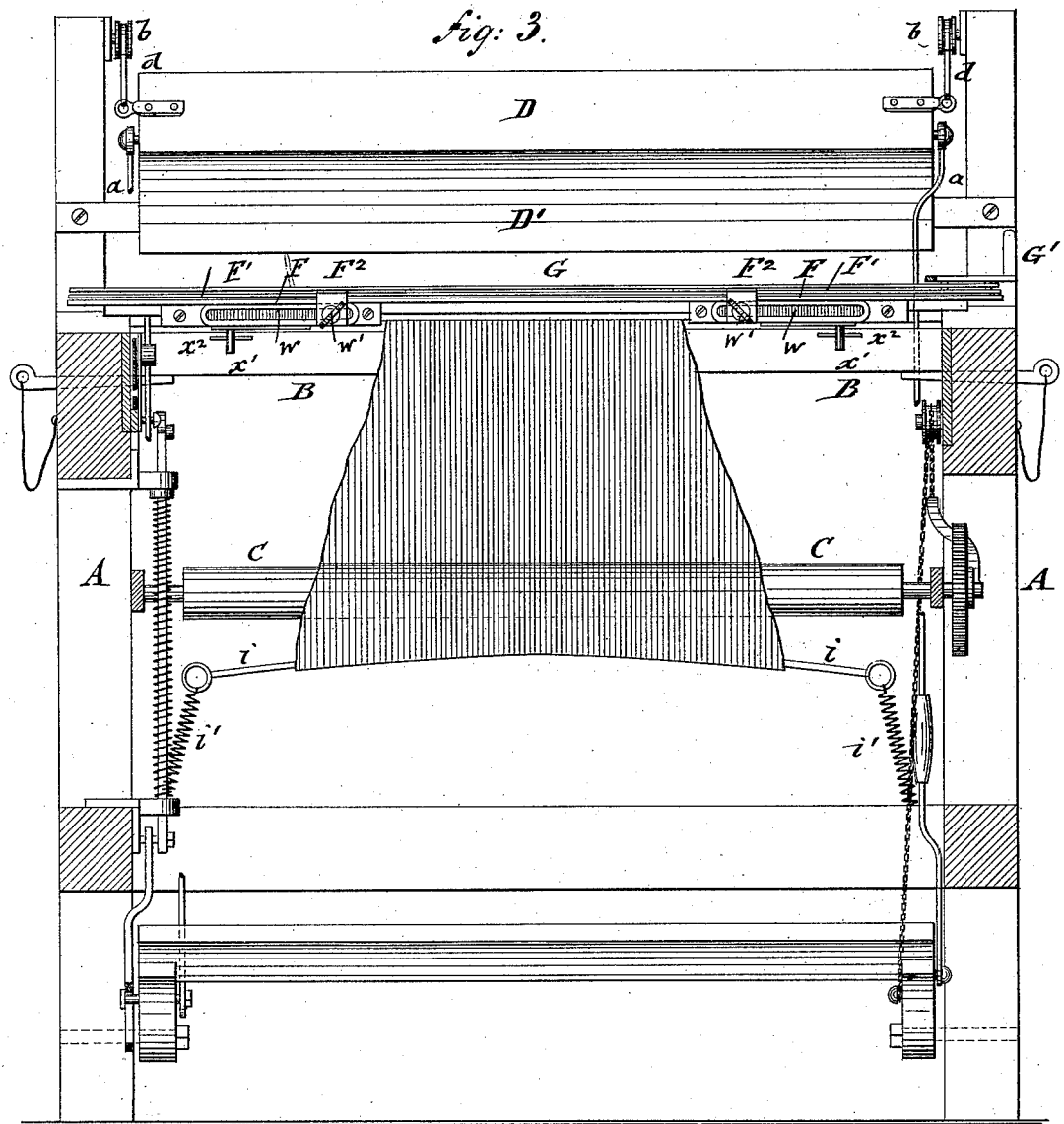
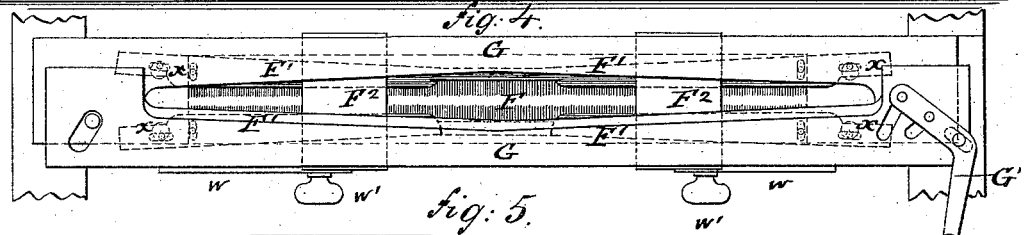
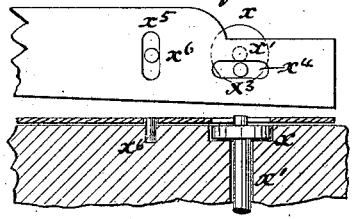
WITNESSES:
A. Schehl
Otto Risch
INVENTORS
Gustav Cimiotti
Ferdinand F. Cimiotti
BY
Paul Goepel
ATTORNEY

UNITED STATES PATENT OFFICE.

GUSTAV CIMIOTTI AND FERDINAND F. CIMIOTTI, OF NEW YORK, N. Y.

MACHINE FOR CLIPPING SEAL AND OTHER SKINS.

SPECIFICATION forming part of Letters Patent No. 307,524, dated November 4, 1884.

Application filed April 30, 1883. Renewed May 5, 1884. (No model.)

*To all whom it may concern:*

Be it known that we, GUSTAV CIMIOTTI and FERDINAND F. CIMIOTTI, both of the city, county, and State of New York, have invented certain new and useful Improvements in Machines for Clipping Seal and other Skins, of which the following is a specification.

This invention has reference to certain improvements in the machine for clipping seal and other skins for which Letters Patent have been granted to us heretofore under date of April 12, 1881, and numbered 240,007, which improvements are designed with a view to increase the efficient working of our machine, and to protect in a still greater degree the wool of the furs to be clipped against any accidental injury or cutting arising from the inattention of the workmen or from irregular skins. By means of the improvements the machine is also adapted to trim those parts of the furs with a shorter wool, which parts could not be clipped by our former machine, and which had consequently to be clipped by hand.

The invention consists of a knife-edged bar, over which the fur is stretched and fed by suitable means, of a device for delivering a current of air on that part of the skin stretched tight over the edge of the bar, and of oscillating guard-combs having auxiliary guard-plates that are arranged above the comb and set forward or back thereon, so as to retain and protect the shorter wool.

The invention consists, further, of laterally-adjustable edge-protectors above the guard-plate, that protect the wool at the edges of the skins against injury by the cutting-knives above the edge-protectors, as will be more fully explained hereinafter, and finally be pointed out in the claims.

Figure 1:
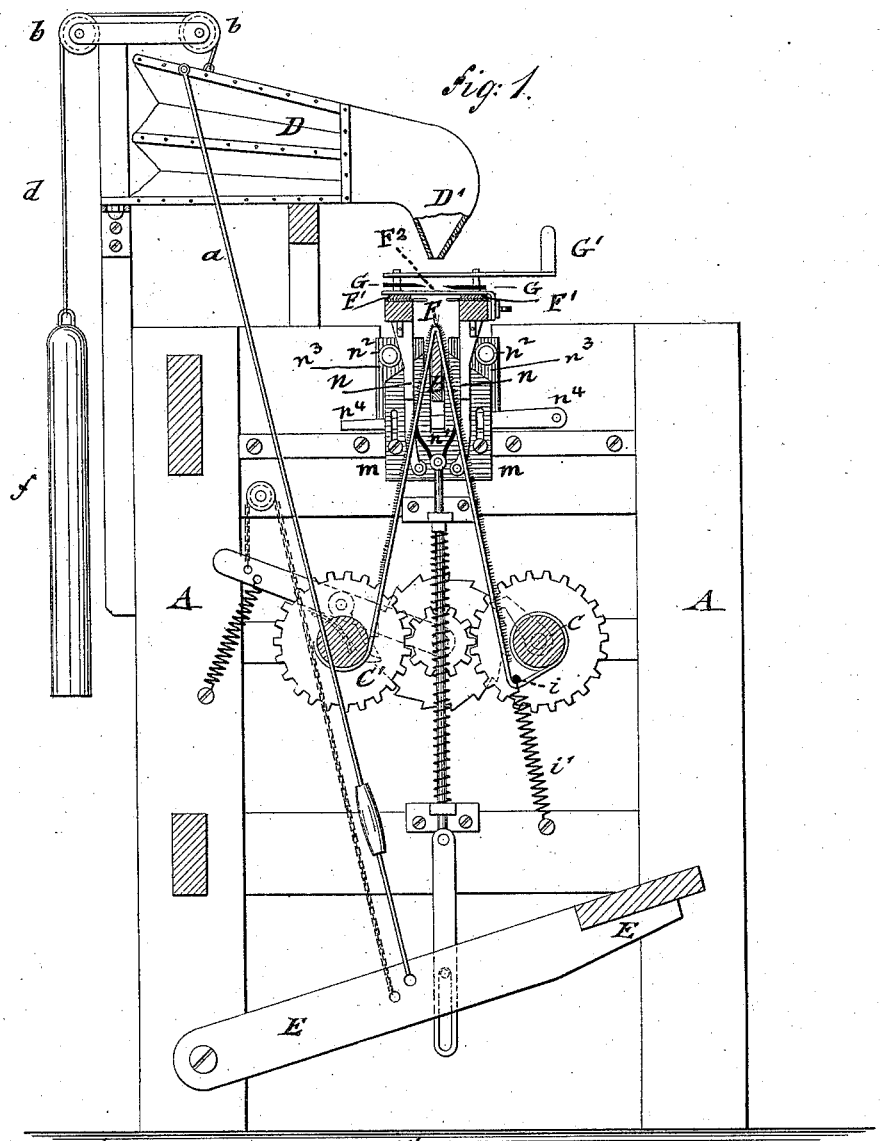
Figure 2:
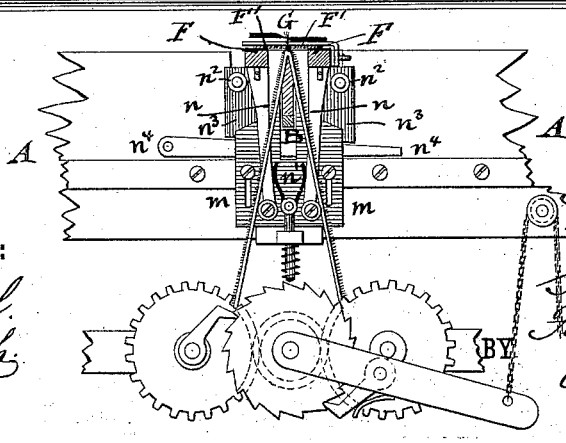

In the accompanying drawings, Figures 1 and 2 represent vertical transverse sections of our improved machine for clipping seal and other skins, shown, respectively, before and during the clipping operation. Fig. 3 is a front elevation, partly in section. Fig. 4 is a detail plan of the guard-combs, plates, edge-protectors, and clipping-knives; and Fig. 5 are details of one of the auxiliary guard-plates and its actuating mechanism.

Similar letters of reference indicate corresponding parts.

Referring to the drawings, A represents the supporting-frame of our improved machine for clipping seal and other skins, and B is a fixed knife-edged bar that extends transversely across the frame. Over this bar the sealskin or other fur is tightly stretched by means of a roller, C, at one side of the knife-edged bar, and a roller, C', at the other side. The skin is gradually unwound from the roller C and wound up upon the roller C', it being tightly stretched over the edge of the bar B by a transverse rod, $i$, and by spiral springs $i'$, attached to the ends of the rod I and frame A, as shown clearly in Figs. 1 and 3. The rollers C C are intermittently actuated by means of pawls and ratchets or other suitable mechanism operated by a treadle, E, whereby the skin is moved forward step by step over the knife-edged bar, as will more fully appear by reference to the Letters Patent heretofore referred to.

Above the knife-edged bar B, and of the same width as the same, is arranged a bellows or other suitable device, D, for delivering a current of air upon that part of the skin which is at that moment above the knife-edged bar B. The air-delivering device D is provided with a nozzle, D', the narrow discharge-orifice of which is located vertically above the knife-edged bar B. The bellows D is operated by the alternating action of the treadle E, which is connected thereto by cords or rods $a$, and of suitable weights, $f$, attached to cords $d$, which are passed over pulleys $b$ at the upper part of the frame A. The treadle E is also connected by suitable intermediate mechanism with slotted and vertical guide-plates $m$, which are provided with central recesses at their upper parts for the bar B.

To the lower parts of the guide-plates $m$ are pivoted the shanks $n$ of oscillating guard-combs F, which are arranged above and symmetrical to the knife-edged bar B, and pressed outwardly away from the same by a V-shaped spring, $n'$. The inclined rear sides of the shanks $n$ of the combs F move during the downward motion of the treadle along antifriction rollers $n^2$ of side plates, $n^3$, of frame A.

The joint action of the slotted guide-plates $m$ and rollers $n^2$ serve to move the combs F downward and toward each other, so that they close over that portion of the skin which is at the time above the knife-edged bar. The side plates, $n^3$, and rollers $n^2$ are set higher or lower by means of a wedge-shaped key, $n^4$, or by any other equivalent mechanism, so as to secure the exact position of the combs on the strip of skin above the knife-edge.

Immediately above the guard-combs F are arranged auxiliary guard-plates F′, which are not made of comb shape, but of continuous sheet metal. These auxiliary guard-plates serve for the purpose of protecting those parts of the skin where the wool is very short and irregular—as, for instance, those portions of the skin at and around the fore feet, the head portion, flanks, &c. The guard-plates F′ are moved toward or away from each other by means of eccentrics $x$ at the upper ends of vertical shafts $x'$, which shafts are operated by handles $x^2$ at their lower ends. The shafts of the eccentrics $x$ turn in suitable bearings of frame A. The eccentrics $x$ engage by crank-pins $x^3$ longitudinal slots $x^4$ of the guard-plates F′ and move thereby the guard-plates F′ F′. The guard-plates F′ are further guided by slots $x^5$, that are arranged at right angles to the longitudinal slots $x^4$ on fixed guide-pins $x^6$ of frame A, by which and the eccentric pins the extent of lateral motion of the guard-plates F′ is controlled. The guard-plates F′ are supported on the wooden strips, to which the guard-combs F are secured, each being separately operated by the attendant, who turns first the handles of the rear plate, F′, and then those of the front plate, F′. The effect of the guard-plates F′ is to reduce the length of the combs F projecting beyond the edges of the guard-plates, so that the projecting portion of the combs will correspond in size to the shorter length of wool at those parts of the fur where the guard-plates are to be used. The shorter wool can therefore not pass through the tines of the combs F, and is protected against injury by the cutting-knives G above the guard-plates F′. The guard-plates F′ are retained in this position until those portions of the skin having shorter hair are clipped. They are then returned again into their former position, so as to leave the entire length of the combs free for clipping the remaining parts of the skin in the regular manner set forth in the patent referred to.

By the employment of the auxiliary guard-plates F′ all those parts of the skin which heretofore had to be picked by hand can now be finished on the machine in the same manner as the other parts of the skin having the long wool.

Next above the guard-plates F′ are arranged laterally-adjustable edge-plates F², which serve for protecting the edges of the skins. The edge plates or protectors F² are guided in slotted ways $w$ $w$ of the supporting-strip of the front comb, F, and secured thereto after adjustment by set-screws $w'$ $w'$, as shown clearly in Figs. 3 and 4. These edge-protectors F² are extended from the front strip backward over the combs, and are set exactly to the width of the skin. They serve to keep the edges down, so that that part of the wool which would spring or project through the combs, owing to the curling up of the edges, is covered and prevented from being cut off by the cutting-knives G, which are arranged next above the laterally-adjustable protectors, and operated by the hand-crank G′ so as to clip and cut off the projecting bristles or water-hairs.

By means of the auxiliary devices described—to wit, the guard-plates for the retention of the short wool and the laterally-adjustable edge-protectors—the clipping of seal or other skins can be accomplished in a more perfect and reliable manner without the least injury to the fine wool of the skin, so that the entire surface of the skin assumes finally that soft velvety appearance which is the characteristic of a carefully-clipped skin.

Having thus described our invention, we claim as new and desire to secure by Letters Patent—

1. In a machine for clipping seal and other skins, the combination of a knife-edged bar, means for stretching and feeding the skin over said bar, a device for delivering a current of air upon that part of the skin above the edge of the bar, oscillating guard-combs arranged at both sides of the bar, auxiliary guard-plates arranged above the combs, and means for adjusting the auxiliary guard-plates, substantially as and for the purpose set forth.

2. In a machine for clipping seal and other skins, the combination of a knife-edged bar, means for stretching and feeding the skin over the bar, a device for delivering a current of air upon that part of the skin above the edge of the bar, oscillating guard-combs arranged at both sides of the bar, auxiliary guard-plates above the combs, and reciprocating clipping-knives above the guard-plates, substantially as and for the purpose set forth.

3. In a machine for clipping seal and other skins, the oscillating guard-combs provided with auxiliary guard-plates arranged above the combs, and with means for setting the guard-plates forward or backward, so as to shorten or lengthen the projecting portions of the combs, substantially as set forth.

4. In a machine for clipping seal and other skins, the combination of a knife-edged bar, means for stretching and feeding the skin over the bar, a device for delivering a current of air on the strip of skin above the knife-edge, oscillating guard-combs at both sides of the bar, auxiliary guard-plates above the combs, laterally-adjustable edge plates or protectors extending transversely over the guard-combs and guard-plates, and reciprocating clipping-knives arranged above the edge-protectors, substantially as and for the purpose specified.

5. In a machine for clipping seal and other skins, the combination of the oscillating guard-combs, guard-plates arranged above the combs, means for setting the guard-plates on the combs, and laterally-adjustable edge-protectors, which are guided along the strip of the front comb and extended backward over the guard-plates of both combs, substantially as specified.

In testimony that we claim the foregoing as our invention we have signed our names in presence of two subscribing witnesses.

GUSTAV CIMIOTTI.
FERDINAND F. CIMIOTTI.

Witnesses:
OTTO RISCH,
SIDNEY MANN.